(12) United States Patent
Sugimoto et al.

(10) Patent No.: US 7,628,447 B2
(45) Date of Patent: Dec. 8, 2009

(54) HARNESS CLIP

(75) Inventors: Naoki Sugimoto, Kanagawa (JP); Hiromasa Akaho, Kanagawa (JP)

(73) Assignee: Piolax, Inc., Yokohama-shi, Kanagawa (JP)

( * ) Notice: Subject to any disclaimer, the term of this patent is extended or adjusted under 35 U.S.C. 154(b) by 296 days.

(21) Appl. No.: 11/524,521

(22) Filed: Sep. 21, 2006

(65) Prior Publication Data
US 2007/0063116 A1 Mar. 22, 2007

(30) Foreign Application Priority Data
Sep. 22, 2005 (JP) ............... 2005-276540

(51) Int. Cl.
*B60J 7/00* (2006.01)
*F16L 3/22* (2006.01)
(52) U.S. Cl. ........................ 296/209; 248/49
(58) Field of Classification Search ........... 296/203.03, 296/209, 208; 248/49, 58, 65, 73, 74.1, 74.2, 248/75, 79
See application file for complete search history.

(56) References Cited

U.S. PATENT DOCUMENTS

| | | | | |
|---|---|---|---|---|
| 3,210,031 | A | * 10/1965 | Munse ........................ | 248/73 |
| 7,140,070 | B2 | * 11/2006 | Yuta et al. ..................... | 16/4 |
| 2005/0116122 | A1 | 6/2005 | Nakanishi | |

FOREIGN PATENT DOCUMENTS

| | | |
|---|---|---|
| CN | 1496897 A | 5/2004 |
| JP | 61-6008 | 1/1986 |
| JP | 63-180450 | 11/1988 |
| JP | 1-167934 | 11/1989 |
| JP | 2-26949 | 2/1990 |
| JP | 2-84007 | 6/1990 |
| JP | 07-137567 | 5/1995 |
| JP | 10-100771 | 4/1998 |
| JP | 2004-122809 | 4/2004 |

OTHER PUBLICATIONS

Chinese Office Action dated Mar. 20, 2008 (with English translation).
Japanese Office Action dated Jun. 2, 2009 with an English-Language translation.

* cited by examiner

*Primary Examiner*—Joseph D Pape
(74) *Attorney, Agent, or Firm*—McGinn IP Law Group, PLLC

(57) ABSTRACT

A harness clip includes a base portion having a leg portion for engagement with a rocker panel, a side wall portion standing on and extending from one side edge of the base portion, and a harness holding portion which is connected to the side wall portion through a hinge portion, and a lock portion for engagement with the base portion at a distal end edge portion of the harness holding portion. The distal end edge portion of the harness holding portion is formed into a substantially L-shape when viewed from an end surface thereof to provide an angular portion, and this angular portion is locked to the base portion in contacting relation to an upper surface of the base portion. Therefore, even when a load is applied to the harness clip, the harness can be stably held without canceling the engagement of the lock portion with the base portion.

20 Claims, 6 Drawing Sheets

HARNESS CLIP

This application is based on Japanese Patent Application No. 2005-276540, which is incorporated herein by reference.

BACKGROUND OF THE INVENTION

1. Field of the Invention

This invention relates to a harness clip for mounting on a rocker panel of an automobile so as to hold a harness located on the rocker panel.

2. Description of the Related Art

A rocker panel is provided at a lower portion of each of opposite sides of an automobile, and extends in a forward-rearward direction of a vehicle body, and a harness is mounted on the rocker panel through a clip. The rocker panel is located at a lower edge of a door opening in which a door is mounted, and therefore a cover member called a kicking plate is mounted on the clip so as to protect the harness from a load applied when a passenger enters or exits the vehicle.

JP-A-2004-122809 mentioned below discloses a related clip of this kind which includes a base portion for being fixed to the rocker panel, an upstanding portion extending upwardly from one end of the base portion, and a carpet engagement projection extending upwardly from the other end of the base portion. Further, a pair of opposed first and second bow-like piece portions each with a curved shape are connected to the upstanding portion through respective hinges. Furthermore, a kicking plate (a rocker molding) is attached to the clip by retaining portions provided respectively at the upstanding portion and the first bow-like piece portion.

A carpet is attached to the carpet engagement projection, and the first bow-like piece portion is brought into engagement with the carpet engagement projection, and thereafter a harness is placed on the first bow-like piece portion, and the second bow-like piece portion is turned, so that a retaining claw formed at a distal end of this second bow-like piece portion is engaged in a retaining groove formed in the first bow-like piece portion, thereby holding the harness.

However, the first and second bow-like piece portions of the JP-A-2004-122809 which hold the harness are engaged with each other merely through the retaining claw and the retaining groove, and therefore for example, when a large load is applied from the kicking plate or when the carpet is pulled, so that the load is applied to the retaining claw or the retaining groove in such a direction as to cancel the engagement between the retaining claw and the retaining groove, there is a possibility that this engagement is easily canceled, so that the first and second bow-like piece portions are disengaged from each other. As a result, it is difficult to retain the harness in position.

SUMMARY OF THE INVENTION

It is therefore an object of this invention to provide a harness clip capable of stably holding a harness on a rocker panel of an automobile.

In order to achieve the above object, in a first aspect of the invention, a harness clip mounted on a rocker panel of an automobile for holding a harness comprises: a base portion having a leg portion for engagement with the rocker panel; a side wall portion standing on and extending from one side edge of the base portion; and a harness holding portion which is connected to the side wall portion through a hinge portion, and is curved so as to hold the harness, and has a lock portion for engagement with the base portion at a distal end edge portion of the harness holding portion, wherein the distal end edge portion of the harness holding portion is formed into a substantially L-shape when viewed from an end surface thereof to provide an angular portion, and the angular portion is locked to the base portion in contacting relation to an upper surface of the base portion.

According to the first aspect of the invention, the harness is placed on the upper surface of the base portion, and the harness holding portion is turned through the hinge portion, and the lock portion is brought into engagement with the base portion, and by doing so, the harness can be held by the harness clip. Then, the leg portion is brought into engagement with the rocker panel, thereby fixing the harness clip to the rocker panel.

Even when a load is applied to the harness clip, this load can be received by the angular portion of the harness holding portion and the base portion since the angular portion of the harness holding portion is held in contact with the base portion. And besides, the load acts directly on the lock portion, so that the harness can be stably held by the harness clip without canceling the engagement of the lock portion with the base portion.

In a second aspect of the invention, the harness clip further comprises an engagement portion with which a support leg of a kicking plate is adapted to be engaged on the harness holding portion. Incidentally, the engagement portion is disposed above the angular portion.

According to the second aspect of the invention, the support leg of the kicking plate is inserted to be engaged with the engagement portion, and by doing so, the kicking plate can be fixed to the harness clip. A load applied to the kicking plate acts on the engagement portion of the harness holding portion through the support leg. However, this engagement portion is disposed above the L-shaped angular portion, and therefore this load can be received by the angular portion of the harness holding portion and the base portion, so that the kicking plate can be stably held by the harness clip.

In a third aspect of the invention, the lock portion is engaged with the base portion at a region disposed below a harness holding space formed internally of the harness holding portion and the base portion.

According to the third aspect of the invention, when the harness holding portion and the harness are pressed by a load from the kicking plate, this pressing force serves to increase a force of engagement between the lock portion and the base portion which are disposed below the harness holding space, and therefore the force of engagement between the lock portion and the base portion can be increased.

In a fourth aspect of the invention, the base portion has a convex portion along a corner portion of the rocker panel. Incidentally, the convex portion projects downwardly from the base portion.

According to the fourth aspect of the invention, the lower surface of the base portion is disposed in contiguous relation to the corner portion of the rocker panel, and therefore is fitted to this corner portion, and therefore not only a strong resistance to a load from the upper side but also a strong resistance to a load in a rolling direction can be obtained, so that the loads acting on the kicking plate and the harness holding portion can be supported more stably.

In a fifth aspect of the invention, a support portion is formed on at least one of the side wall portion and the harness holding portion, the support portion projecting toward an inner surface of a kicking plate.

According to the fifth aspect of the invention, even when a load is applied to the kicking plate, the support portion or portions formed on the side wall portion and/or the harness holding portion abut against the inner surface of the kicking plate to support the kicking plate, and therefore the kicking plate can be stably supported. And besides, the side wall portion and/or the harness holding portion are reinforced, thereby increasing the strength of the harness clip.

In a sixth aspect of the invention, the harness clip further comprises a rib at a substantially central portion of the base portion, the rib extending along an axis of the harness which is to be held by the harness clip. Incidentally, the rib comprises: a lock piece portion for engagement with the lock portion is formed on and projects from one side edge of an upper end surface of the rib in substantially parallel relation to the base portion; and a holding piece portion for holding a carpet is formed on and projects from the other side edge of the upper end surface of the rib in substantially parallel relation to the base portion.

In the invention of claim 6, the carpet is held by the holding piece portion, and the lock portion is engaged with the lock piece portion, and by doing so, not only the harness but also the carpet can be held by the harness clip, and the carpet can be mounted on the rocker panel through the harness clip. And besides, the carpet can be held by the holding piece portion against disengagement from the harness clip before the harness is held by the harness clip, and therefore the efficiency of the operation for mounting the carpet and the harness on the harness clip can be enhanced.

In the harness clip of the invention, the harness is placed on the upper surface of the base portion, and then the lock portion of the harness holding portion is brought into engagement with the base portion, so that the harness can be held by the harness clip, and in this condition the leg portion is brought into engagement with the rocker panel, thereby fixing the harness clip to the rocker panel. Even when a load is applied to the harness clip, this load can be received by the angular portion of the harness holding portion and the base portion since the angular portion of the harness holding portion is held in contact with the base portion. And, the load acts directly on the lock portion, so that the harness can be stably held by the harness clip without canceling the engagement of the lock portion with the base portion.

DETAILED DESCRIPTION OF THE PREFERRED EMBODIMENTS

One preferred embodiment of a harness clip of the present invention will now be described with reference to FIGS. 1 to 6.

Figure 1:
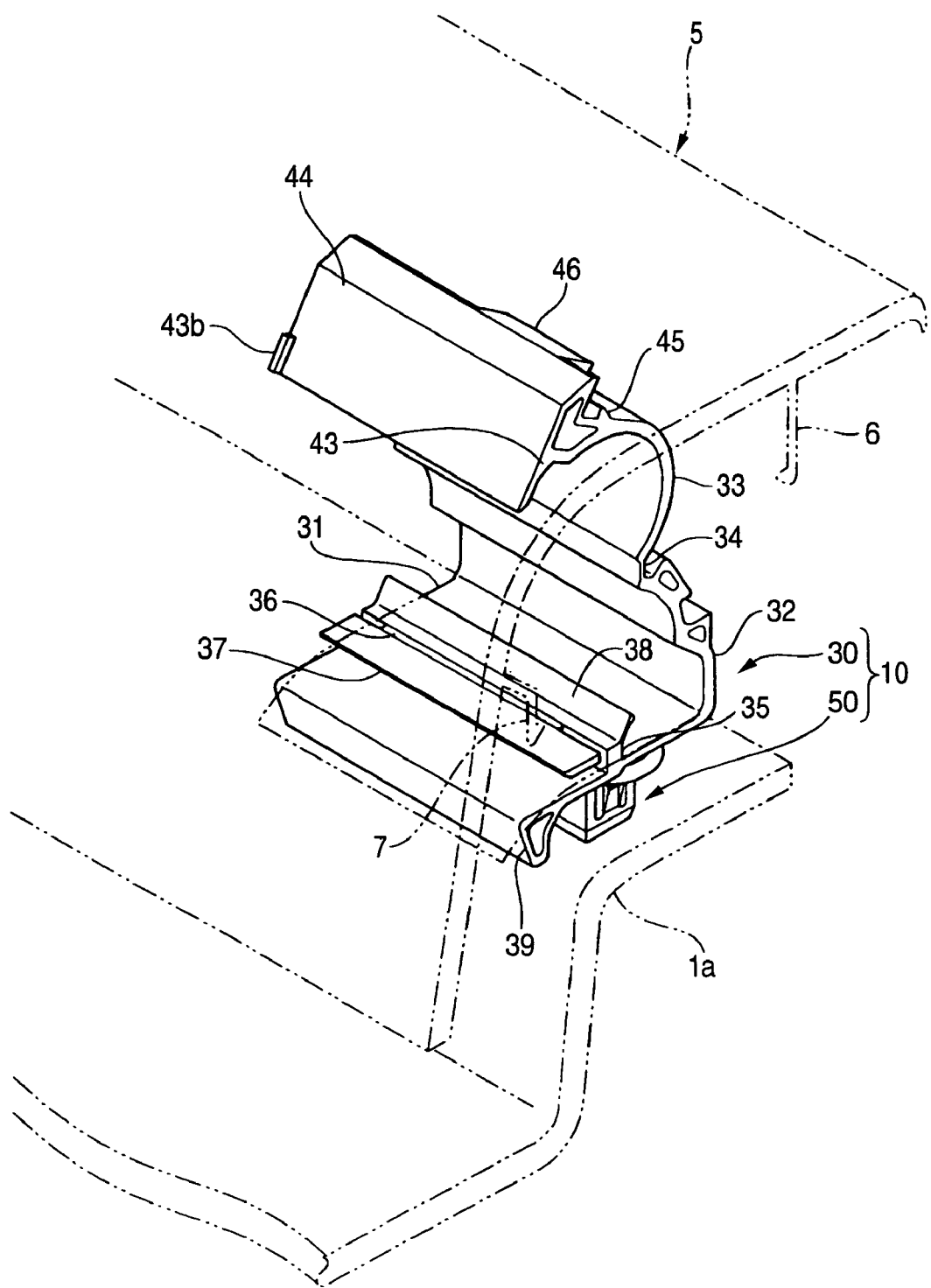
FIG. 1 is a perspective view showing one preferred embodiment of a harness clip of the present invention.
Figure 5:
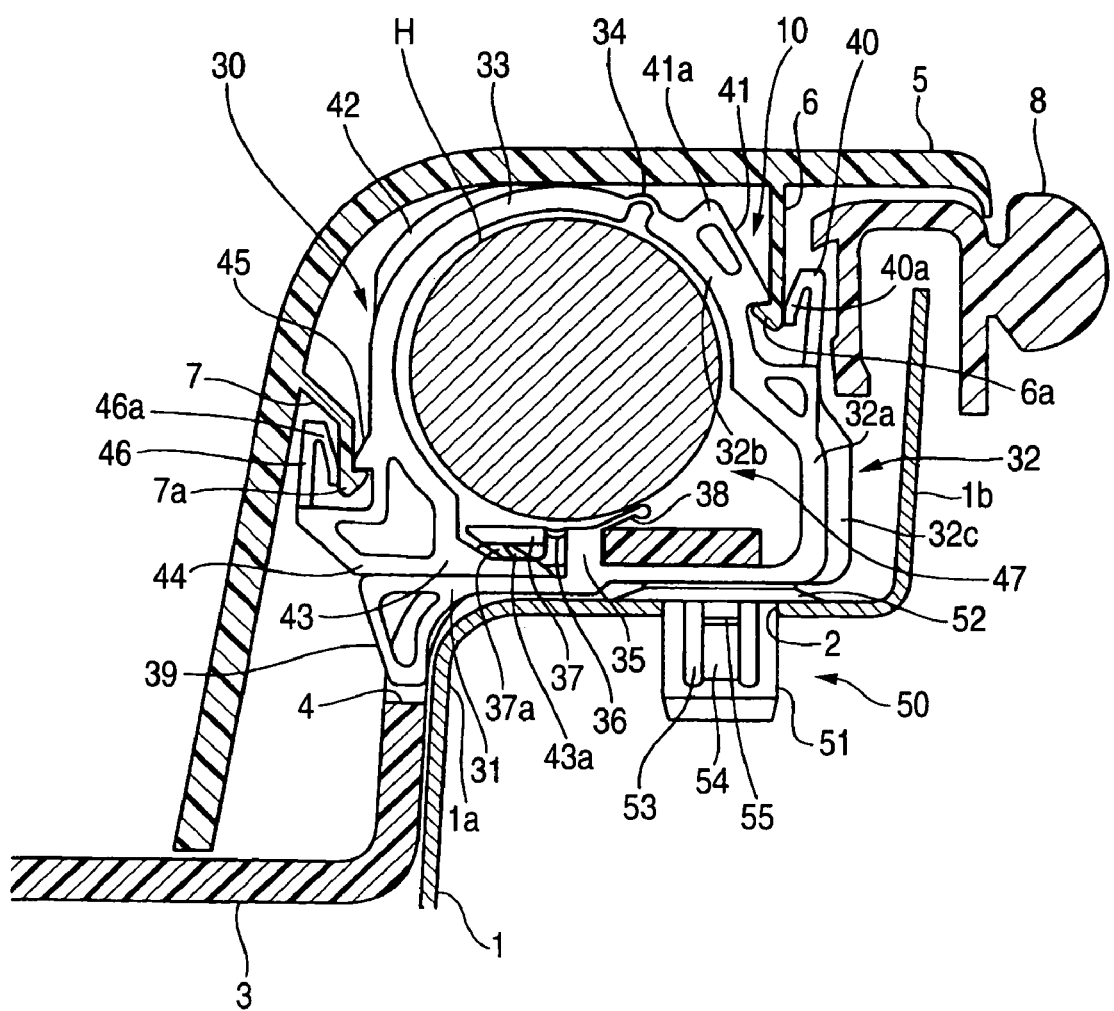
FIG. 5 is a view explanatory of a condition in which the harness is held on the rocker panel by the use of the harness clip.

As shown in FIGS. 1 and 5, the harness clip 10 is used for mounting a harness (wire harness) H on a rocker panel 1 of an automobile. Although the showing of its overall configuration is omitted here, the rocker panel 1 is formed by bending a metal sheet into such a shape that it has corner or angular portions. The rocker panel 1 has an engagement hole 2 in which a leg portion 50 of the harness clip 10 (described later) can be engaged. The corner portion 1a of the rocker panel 1 has a substantially arc-shape.

Figure 6:
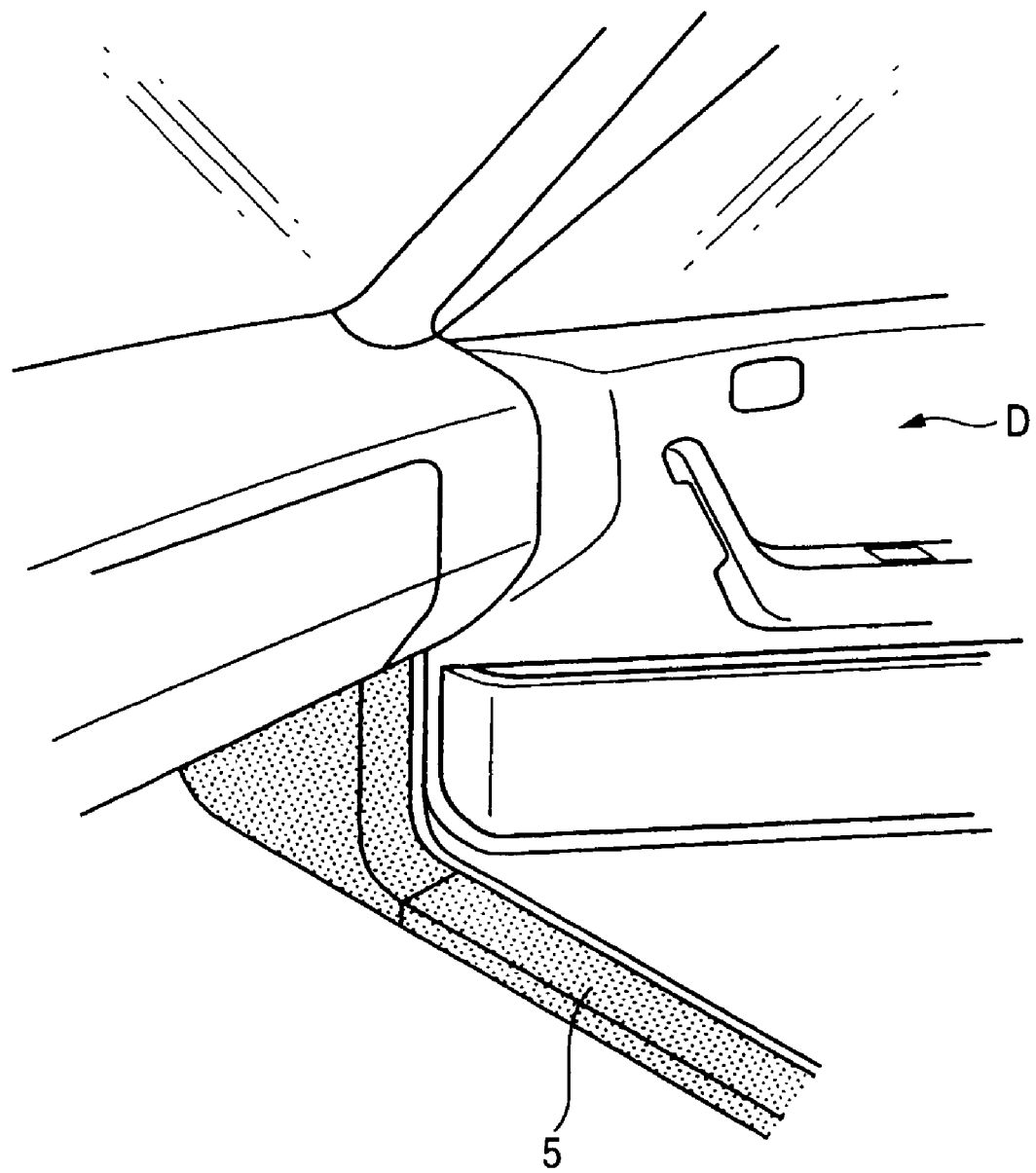
FIG. 6 is a perspective view explanatory of a portion of the inside of an automobile where the harness clip is used.

A kicking plate 5 is mounted on the upper side of the harness clip 10, and is provided at a lower edge of a door opening in which a door is mounted, as shown in FIG. 6. As shown in FIG. 1, this kicking plate 5 has a bent shape corresponding to the shape of the rocker panel 1, and support legs 6 and 7 project from a lower surface of the kicking plate 5. Claws 6a and 7a for engagement with respective engagement portions 41 and 45 (described later) of the harness clip 10 are formed respectively at distal ends of the support legs 6 and 7.

The harness clip 10 mainly includes a clip body 30 for holding the harness H, and the leg portion 50 for being fixed to the rocker panel 1.

The clip body 30 includes a base portion 31, a side wall portion 32 formed on and extending upwardly from one side edge of the base portion 31, and a harness holding portion 33 formed into a curved shape so as to hold the harness H. The side wall portion 32 and the harness holding portion 33 are interconnected at their end portions by a hinge portion 34. The base portion 31 and the harness holding portion 33 jointly form a harness holding space 47 for holding the harness H.

As shown in FIG. 1, a rib 35 is formed at a substantially central portion of the base portion 31, and extends along an axis of the harness H which is to be held by the harness clip 10. A lock piece portion 37 is formed on and projects from one side edge (close to an opening of the harness clip) of an upper end surface of the rib 35 through a thinned portion 36, and is disposed substantially parallel to the base portion 31. A claw 37a is formed at a distal end of the lock piece portion 37, and extends obliquely downwardly therefrom. The lock piece portion 37 can be engaged with a lock portion 43 of the harness holding portion 33 (described later) so as to close the harness holding portion 33. The claw 37a has a length slightly smaller than the width of the lock piece portion 37 so that this claw 37a can be easily bent (or elastically deformed), and can be easily brought into engagement with a claw 43a of the lock portion 43 (described later). The thinned portion 36 is notched at its opposite sides, and has a width smaller than the width of the rib 35 so that the lock piece portion 37 can be easily bent.

A holding piece portion 38 is formed on and projects obliquely upwardly from the other side edge (close to the side wall portion 32) of the upper end surface of the rib 35. This holding piece portion 38 is held against an upper surface of a carpet 3 to prevent the carpet 3 from disengagement from the rib 35 when the carpet 3 is engaged with the rib 35 so as to be retained by the harness clip 10.

A convex portion 39 is formed on and projects downwardly from the lower surface of the base portion 31 at the other side edge portion thereof remote from the side wall portion 32, the convex portion 39 being so shaped as to be disposed contiguous to the corner portion 1a of the rocker panel 1. In this embodiment, an inner side (close to the side wall portion 32) of the convex portion 39 which is to be disposed contiguous to the substantially arc-shaped corner portion 1a of the rocker panel 1 has also a substantially arc-shape, and is fitted to this corner portion 1a when the harness clip 10 is engaged with the rocker panel 1. Therefore, when a load is applied to the harness clip 10 from the upper side of the kicking plate 5, the harness clip 10 exhibits a strong resistance to this load, and besides even when a load in a rolling direction (that is, a load in an oblique direction) acts on the leg portion 50 so as to disengage this leg portion 50 from the rocker panel 1 as upon pulling of the carpet 3, the harness clip 10 exhibits a strong resistance to this load. Therefore, the harness clip 10 can more stably support loads acting on the kicking plate 5 and the harness holding portion 33.

The side wall portion 32, standing on and extending from the one side edge of the base portion 31, includes an upstanding wall 32a standing on and extending from the base portion 31, and a curved wall 32b of a substantially arc-shape extending from an upper end of the upstanding wall 32a.

The engagement portion 41 is formed on and projects from an outer peripheral surface of the curved wall 32b, and extends in a peripheral direction of the arc-shaped curved wall 32b. A holding portion 40 of a predetermined width is formed on and projects upwardly from an upper end or edge of the upstanding wall 32a, and is spaced a predetermined distance from the engagement portion 41. Further, a holding claw 40a extends obliquely downwardly from an upper end of the holding portion 40.

When the support leg 6 of the kicking plate 5 is inserted between the engagement portion 41 and the holding portion 40, the claw 6a at the distal end of the support leg 6 is engaged with a lower end of the engagement portion 41, so that the kicking plate 5 is engaged with the side plate portion 32. In this condition, the holding claw 40a of the holding portion 40 is elastically held against the support leg 6 to prevent elastic deformation of the support leg 6, thereby retaining the support leg 6 against withdrawal.

An upper end portion of the engagement portion 41 defines a support portion 41a, and when a load is applied to the kicking plate 5, this support portion 41a abuts against the inner surface of the kicking plate 5 to support the kicking plate 5. A rib 32c, extending in the upward-downward direction, is formed at a substantially widthwise-central portion of the upstanding wall 32a, and serves to reinforce the side wall portion 32.

Figure 2:
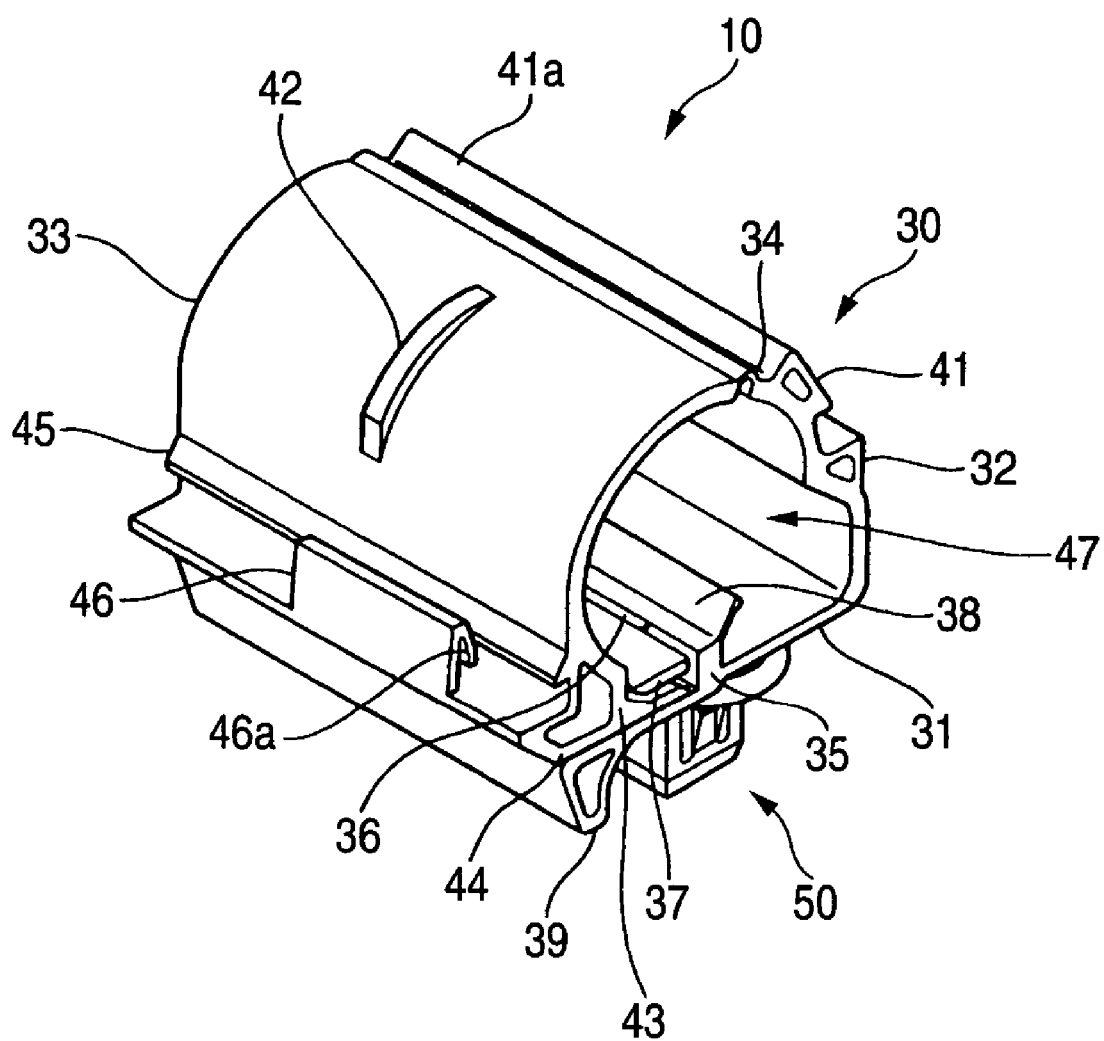
FIG. 2 is a perspective view of the harness clip in its closed condition.

The harness holding portion 33 is curved into a semicircular shape so as to effectively hold the harness H, and this harness holding portion 33 is connected at its one end to the end portion of the curved wall 32b of the side wall portion 32 through the hinge portion 34. As shown in FIG. 2, a rib-like support portion 42 is formed on and projects from a substantially central portion (in the axial direction) of the harness holding portion 33, and extends in a peripheral direction thereof. This support portion 42 performs a function similar to that of the above-mentioned upper end portion of the engagement portion 41.

Namely, the support portions 41a and 42 are formed respectively at the side wall portion 32 and the harness holding portion 33, and therefore even when a load is applied to the kicking plate 5, these support portions 41a and 42 abut against the inner surface of the kicking plate 5 to support the kicking plate 5, and therefore the harness clip 10 can stably support the kicking plate 5. And besides, these support portions reinforce the side wall portion 32 and the harness holding portion 33 to increase the overall strength of the harness clip 10.

The lock portion 43 is formed at the distal end edge portion of the harness holding portion 33 remote from the hinge portion 34. This lock portion 43 includes an angular portion 44 having a substantially L-shape when viewed from an end surface thereof. The claw 43a is formed at a distal end of the lock portion 43, and projects obliquely upwardly therefrom. A length of the claw 43a is smaller than the width of the lock portion 43, and corresponds to the length of the claw 37a of the lock piece portion 37 so that this claw 43a can be easily brought into engagement with the claw 37a of the lock piece portion 37.

When the claw 43a of the lock portion 43 is brought into engagement with the claw 37a of the lock piece portion 37, the harness holding portion 33 is locked to the base portion 31, with the angular portion 44 of the lock portion 43 held in contact with the upper surface of the base portion 31.

As shown in FIG. 1, a guide rib 43b is formed on and projects from the lower surface of the lock portion 43 at one side edge portion thereof, and the lock portion 43 can be brought into engagement with the lock piece portion 37 while guiding the side edge of the base portion 31 by this guide rib 43b, and therefore the efficiency of this operation can be enhanced.

The engagement portion 45 is formed on the outer periphery of the harness holding portion 33, and is disposed above the substantially L-shaped angular portion 44 of the lock portion 43. A holding portion 46 is formed on and projects from an upper end edge of the angular portion 44, and is spaced a predetermined distance from the engagement portion 45, and a holding claw 46a extends obliquely downwardly from an upper end of the holding portion 46. Therefore, as is the case with the above-mentioned engagement portion 41 and the holding portion 40 which are formed on the side wall portion 32, the claw 7a on the support leg 7 of the kicking plate 5 is engaged with a lower end of the engagement portion 45, so that the kicking plate 5 is engaged with the harness holding portion 33, and also the withdrawal of the support leg 7 is prevented by the holding claw 46a.

Figure 3:
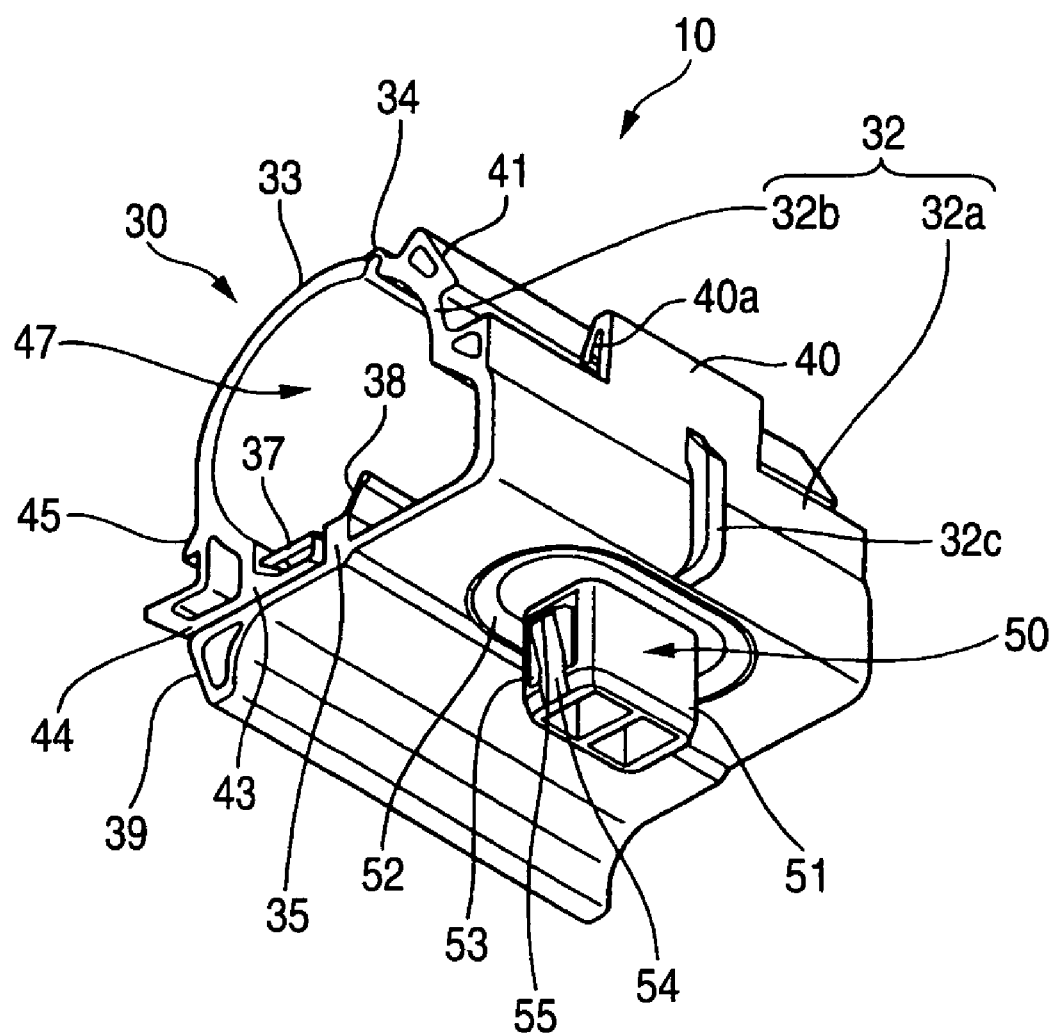
FIG. 3 is a perspective view of the harness clip in its closed condition as seen obliquely from the lower side thereof of FIG. 2.
Figure 4:
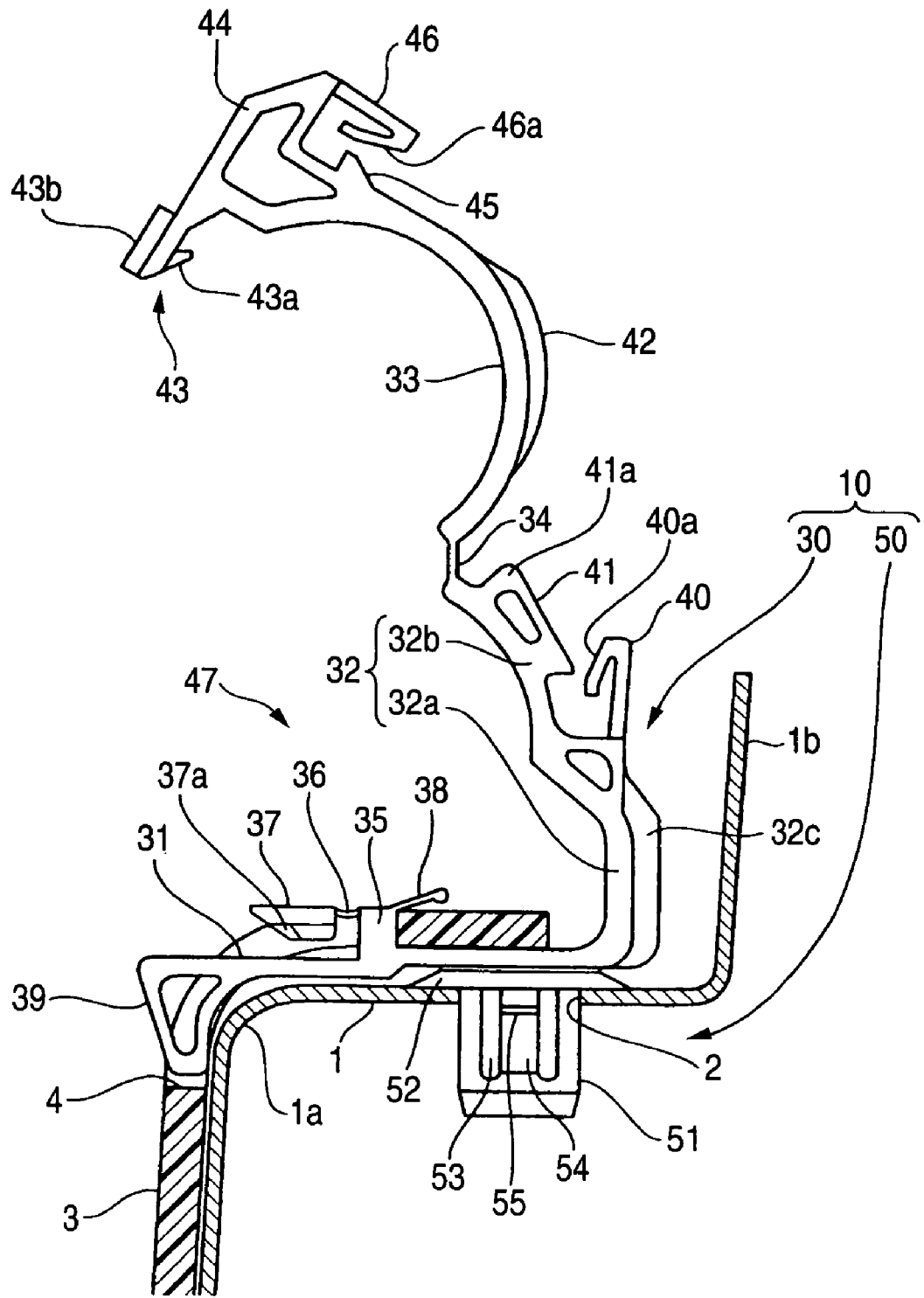
FIG. 4 is a view explanatory of a process of holding a harness on a rocker panel by the use of the harness clip.

As shown in FIGS. 4 and 5, the leg portion 50 for engagement in the engagement hole 2 in the rocker panel 1 is formed on the lower surface (facing away from the side wall portion 32) of the base portion 31. Referring further to FIG. 3, this leg portion 50 includes a square tubular portion 51, and a skirt-like flange portion 52 formed at a proximal end of the square tubular portion 51 over an entire periphery thereof, the flange portion 52 having an outer peripheral edge portion flaring downwardly. Elastic engagement piece portions 54 are formed respectively at a pair of opposed side walls of the square tubular portion 51 through respective U-shaped slits 53. Each of the elastic engagement piece portions 54 is tapering, in which gradually increasing in height or thickness from the distal end of the leg portion 50 toward the proximal end thereof, and a step portion 55 is formed at a distal end portion of the elastic engagement piece portion 54. The step portions 55 and 55 of the two elastic engagement piece portions 54 are engaged with that portion of the reverse side (or surface) the rocker panel 1 defining a peripheral edge portion of the engagement hole 2, thereby fixing the harness clip 10 to the rocker panel 1. When the harness clip 10 is engaged with the lock panel 1, the flange portion 52 is elastically held against that portion of the upper surface of the rocker panel 1 defining the peripheral edge portion of the engagement hole 2, thereby suppressing the shaking, etc., of the harness clip 10. The leg portion 50 can have any other suitable shape such as an anchor-shape, and is not particularly limited to any specified shape.

Next, a process of holding the harness H on the rocker panel 1 by the use of the harness clip 10 of the invention will be described.

First, the rib 35 of the harness clip 10 is inserted into amounting hole 4 in the carpet 3, and is engaged with the carpet 3 as shown in FIG. 4, and by doing so, the carpet 3 is attached to the inner side of the harness clip 10. In this condition, when the harness holding portion 33 is brought into engagement with the base portion 31, and is locked thereto, the carpet 3 is positively prevented from being disengaged from the harness clip 10. The rib 35 has the holding piece portion 38 formed thereon, and therefore the carpet 3 can be retained by the holding piece portion 38 against disengagement from the rib 35 before the harness H is held by the harness clip 10, and therefore the efficiency of the operation for mounting the carpet 3 and the harness H on the harness clip 10 can be enhanced.

After the carpet 3 is engaged with the rib 35, the leg portion 50 of the harness clip 10 is inserted into the engagement hole 2 from the front side of the rocker panel 1. At this time, the elastic engagement piece portions 54 of the leg portion 50 are pressed by the inner peripheral surface of the engagement hole 2, and are elastically deformed, and then when the step portions 55 reach the engagement hole 2, the elastic engagement piece portions 54 are elastically restored, so that the step portions 55 are engaged with the portion of the reverse side of the rocker panel 1 defining the peripheral edge portion of the engagement hole 2, thereby fixing the harness clip 10 to the rocker panel 1.

Then, the harness H is inserted into the harness holding space 47, and is placed on the upper surfaces of the lock piece portion 37 and the holding piece portion 38 which are formed on the rib 35. In this condition, the harness holding portion 33 is turned through the hinge portion 34, and the lock portion 43, formed at the distal end edge portion of the harness holding portion 33, is inserted into a gap between the base portion 31 and the lock piece portion 37.

As a result, the claw 37a is pressed by the claw 43a, so that the lock piece portion 37 is elastically deformed upwardly, and then when the claw 43a is pushed to reach the end of the claw 37a, the lock piece portion 37 is elastically restored, so that the claws 37a and 43a are engaged with each other. Thus, the harness holding portion 33 is locked to the base portion 31, with the harness holding space 47 closed, and by doing so, the harness H can be held by the harness clip 10. In this manner, both of the carpet 3 and the harness H can be held on the rocker panel 1.

In this process, after the carpet 3 is brought into engagement with the harness clip 10, the harness clip 10 is fixed to the rocker panel 1. However, after the carpet 3 and the harness H are mounted on the harness clip 10, the harness clip 10 can be fixed to the rocker panel 1.

A cushioning member 8 made of rubber is mounted on a side wall 1b of the rocker panel 1 as shown in FIG. 5, and in this condition the support legs 6 and 7 of the kicking plate 5 are inserted respectively into the gap between the engagement portion 41 and the holding portion 40 of the side wall portion 32 and the gap between the engagement portion 45 and the holding portion 46 of the harness holding portion 33, and the claws 6a and 7a are brought into engagement with the lower ends of the engagement portions 41 and 45, respectively. By doing so, the kicking plate 5 can be mounted on the harness clip 10.

Thus, the kicking plate 5 can be mounted at the lower edge of the door opening of the automobile in which the door D is mounted, as shown in FIG. 6. When a passenger steps on the kicking plate 5 so as to enter or exit the automobile, its load acts on the upper surface of the harness holding portion 33 and the support portions 41a and 42 located inside the kicking plate 5, and also acts on the engagement portions 41 and 45 through the support legs 6 and 7, as shown in FIG. 5. Further, the load acts on the harness H located inside the harness holding portion 33.

In the invention, however, the angular portion 44 of the harness holding portion 33 is held in contact with the base portion 31, and therefore the above-mentioned load applied to the harness holding portion 33 is received by the angular portion 44 of the harness holding portion 33 and the base portion 31. And besides, those portions of the lock portion 43 and lock piece portion 37 of the base portion 31 which are engaged with each other are disposed beneath the harness H, and therefore the load applied to the harness H acts in a direction to increase this engaging force. Therefore, the harness H can be positively held by the harness clip 10 without canceling the engagement of the lock portion 43 with the lock piece portion 37 of the base portion 31, and also the kicking plate 5 can be stably supported through the harness clip 10.

When a pulling force acts on the carpet 3 in the condition shown in FIG. 5, a lateral force acts on the harness clip 10 through the rib 35, and this force is exerted in a rolling direction, and tends to withdraw the leg portion 50 from the engagement hole 2 in the rocker panel 1. In the invention, however, the convex portion 39 of the base portion 31 is disposed contiguous to the corner portion 1a of the rocker panel 1, that is, is held against the corner portion 1a, as described above, and therefore a strong resistance to the load exerted in the rolling direction can be obtained, and the engagement of the harness clip 10 with the rocker panel 1 can be stably maintained.

The present invention can be applied to the harness clip which is capable of stably holding the harness on the rocker panel of the automobile.

What is claimed is:

1. A harness clip mounted on a rocker panel of an automobile for holding a harness, said harness clip comprising:
   a base portion having a leg portion for engagement with the rocker panel;
   a side wall portion standing on and extending from one side edge of the base portion; and
   a harness holding portion which is connected to the side wall portion through a hinge portion, and is curved such that an inner surface of the harness holding portion faces the base portion and the side wall portion to hold the harness, and has a lock portion for engagement with the base portion at a distal end edge portion of the harness holding portion,
   wherein the distal end edge portion of the harness holding portion is formed into a substantially L-shape when viewed from an end surface thereof to provide an angular portion, and the angular portion is locked to the base portion in contacting relation to an upper surface of the base portion.

2. The harness clip according to claim 1, further comprising:
   an engagement portion with which a support leg of a kicking plate is adapted to be engaged on the harness holding portion.

3. The harness clip according to claim 2, wherein the engagement portion is disposed above the angular portion.

4. The harness clip according to claim 1, wherein the lock portion is engaged with the base portion at a region between the harness holding portion and the base portion, and
   wherein the harness is held in a space confined between said inner surface of the harness holding portion and the base portion.

5. The harness clip according to claim 1, wherein the base portion has a convex portion along a corner portion of the rocker panel.

6. The harness clip according to claim 5, wherein the convex portion projects downwardly from the base portion.

7. The harness clip according to claim 1, wherein a support portion is formed on at least one of the side wall portion and the harness holding portion, the support portion projecting toward an inner surface of a kicking plate.

8. The harness clip according to claim 1, further comprising:
   a rib at a substantially central portion of the base portion, the rib extending along an axis of the harness which is to be held by the harness clip.

9. The harness clip according to claim 8, wherein the rib comprises:
   a lock piece portion for engagement with the lock portion, said lock piece portion being formed on and projected from one side edge of an upper end surface of the rib in substantially parallel relation to the base portion; and
   a holding piece portion for holding a carpet, said holding piece portion being formed on and projected from the other side edge of the upper end surface of the rib in substantially parallel relation to the base portion.

10. The harness clip according to claim 8, wherein the rib comprises:
    a lock piece portion for engagement with the lock portion, said lock piece portion being formed on and projected from a side edge of an upper end surface of the rib in substantially parallel to the base portion.

11. The harness clip according to claim 10, wherein said lock piece portion projects from said side edge through a thinned plate.

12. The harness clip according to claim 8, wherein said rib holds a carpet, said carpet being held between the rib and the side wall.

13. The harness clip according to claim 8, wherein the rib is spaced at a predetermined distance from the side wall, said rib being substantially perpendicular to said base portion and parallel to an upstanding portion of said side wall.

14. The harness clip according to claim 1, wherein the side wall comprises:
    an upstanding wall standing on and extending from the base portion; and
    a curved wall of a substantially arc-shape extending from an upper end of the upstanding wall, said curved wall having a curvature which extends in a direction of a curvature of the inner surface of the harness holding portion to hold the harness.

15. The harness clip according to claim 14, wherein an engagement portion is formed on and projects from an outer peripheral surface of the curved wall, and extends in a peripheral direction of the arc-shaped curved wall,
    wherein a holding portion is formed on and projects upwardly from an upper end or edge of the upstanding wall, and is spaced at a predetermined distance from the engagement portion, and
    wherein a holding claw extends obliquely downward from an upper end of the holding portion.

16. The harness clip according to claim 1, wherein a claw is formed at a distal end of the lock portion, and projects obliquely toward the inner surface of the harness holding portion.

17. The harness clip according to claim 10, wherein a claw of the lock portion is formed at a distal end of the lock portion, and projects obliquely toward the inner surface of the harness holding portion to engage a claw of the lock piece portion.

18. A harness clip mounted on a rocker panel of an automobile for holding a harness, said harness clip comprising:
    a base portion having a leg portion for engagement with the rocker panel;
    a side wall portion standing on and extending from one side edge of the base portion;
    a harness holding portion which is connected to the side wall portion through a hinge portion, and is curved such that an inner surface of the harness holding portion faces the base portion and the side wall portion to hold the harness, and has a lock portion for engagement with the base portion at a distal end edge portion of the harness holding portion; and
    a rib at a substantially central portion of the base portion, the rib extending along an axis of the harness which is to be held by the harness clip, the rib being spaced at a predetermined distance from the side wall,
    wherein the distal end edge portion of the harness holding portion is formed into a substantially L-shape when viewed from an end surface thereof to provide an angular portion, and the angular portion is locked to the base portion in contacting relation to an upper surface of the base portion, and
    wherein the harness is held in a space confined between said inner surface of the harness holding portion and the base portion.

19. The harness clip according to claim 18, wherein the rib comprises:
    a lock piece portion for engagement with the lock portion, said lock piece portion being formed on and projected from one side edge of an upper end surface of the rib in substantially parallel relation to the base portion; and
    a holding piece portion for holding a carpet, said holding piece portion being formed on and projected from the other side edge of the upper end surface of the rib in substantially parallel to the base portion.

20. A harness clip mounted on a rocker panel of an automobile for holding a harness, said harness clip comprising:
    a base portion having a leg portion for engagement with the rocker panel;
    a side wall portion standing on and extending from one side edge of the base portion;
    a harness holding portion which is connected to the side wall portion through a hinge portion, and is curved to hold the harness, and has a lock portion for engagement with the base portion at a distal end edge portion of the harness holding portion; and
    a rib at a substantially central portion of the base portion, the rib extending along an axis of the harness which is to be held by the harness clip, said rib comprising:
        a lock piece portion for engagement with the lock portion, said lock piece portion being formed on and projected from one side edge of an upper end surface of the rib in substantially parallel relation to the base portion; and
        a holding piece portion for holding a carpet, said holding piece portion being formed on and projected from the other side edge of the upper end surface of the rib in substantially parallel to the base portion,
    wherein the distal end edge portion of the harness holding portion is formed into a substantially L-shape when viewed from an end surface thereof to provide an angular portion, and the angular portion is locked to the base portion in contacting relation to an upper surface of the base portion.

* * * * *